(12) United States Patent
Lee et al.

(10) Patent No.: US 11,927,288 B1
(45) Date of Patent: Mar. 12, 2024

(54) ONE-TOUCH HIGH-PRESSURE FLUID FITTING USING SPRING

(71) Applicant: AHWON CORPORATION, Gunpo-si (KR)

(72) Inventors: Juho Lee, Gwacheon-si (KR); Young Jun Lee, Gwacheon-si (KR)

(73) Assignee: AHWON CORPORATION, Gunpo-si (KR)

( * ) Notice: Subject to any disclaimer, the term of this patent is extended or adjusted under 35 U.S.C. 154(b) by 0 days.

(21) Appl. No.: 17/987,744

(22) Filed: Nov. 15, 2022

(30) Foreign Application Priority Data

Oct. 26, 2022 (KR) .................. 10-2022-0139283

(51) Int. Cl.
*F16L 37/22* (2006.01)
*F16L 37/47* (2006.01)

(52) U.S. Cl.
CPC ............... *F16L 37/22* (2013.01); *F16L 37/47* (2013.01)

(58) Field of Classification Search
CPC ..... F16L 37/0982; F16L 37/138; F16L 37/22; F16L 37/407
See application file for complete search history.

(56) References Cited

U.S. PATENT DOCUMENTS

| | | | | |
|---|---|---|---|---|
| 3,468,562 A * | 9/1969 | Ho | ............................ | F16L 37/22 285/423 |
| 4,645,246 A * | 2/1987 | Guest | .................. | F16L 37/0982 285/423 |
| 4,905,964 A * | 3/1990 | Shiozaki | ............. | F16L 37/0982 251/149.6 |
| 5,042,848 A * | 8/1991 | Shiozaki | ............... | F16L 37/138 285/423 |
| 5,443,289 A * | 8/1995 | Guest | .................. | F16L 37/0982 285/308 |
| 5,607,193 A * | 3/1997 | Guest | .................. | F16L 37/0982 285/308 |
| 5,626,371 A * | 5/1997 | Bartholomew | ..... | F16L 37/0982 285/921 |
| 5,653,480 A * | 8/1997 | Mine | ....................... | F16L 37/22 285/276 |
| 5,722,696 A * | 3/1998 | Taneya | ................ | F16L 37/0982 285/39 |
| 6,079,750 A * | 6/2000 | Kacines | .................. | F16L 37/22 285/23 |
| 6,843,507 B2 * | 1/2005 | Muto | .................. | F16L 37/0982 285/39 |
| 10,458,582 B2 * | 10/2019 | Williams | ............ | F16L 37/0928 |

(Continued)

FOREIGN PATENT DOCUMENTS

EP 0268251 A1 * 5/1988 .......... F16L 37/0982
FR 2868499 A1 * 10/2005 .......... F16L 37/0982

(Continued)

*Primary Examiner* — Matthew Troutman
*Assistant Examiner* — Fannie C Kee
(74) *Attorney, Agent, or Firm* — Heedong Chae; Lucem, PC (57) ABSTRACT

A one-touch high-pressure fluid fitting using a spring, in which the spring is used to press a sealing ring and simultaneously elastically support an inward inclined surface of a fitting cap, and the fitting cap is expanded upon unfastening so as to maintain an internal airtightness of a fitting body and allow a detachable structure between the fitting body and the fitting cap to be smoothly implemented.

2 Claims, 8 Drawing Sheets

(56) References Cited

U.S. PATENT DOCUMENTS

2007/0096463 A1\* 5/2007 Kissel ................. F16L 37/0982
 285/305
2010/0253064 A1\* 10/2010 Le Quere ............ F16L 37/0982
 29/428

FOREIGN PATENT DOCUMENTS

KR 10-2021-0069239 A 6/2021
WO WO-0186189 A1 \* 11/2001 .......... F16L 37/0982

\* cited by examiner

ONE-TOUCH HIGH-PRESSURE FLUID FITTING USING SPRING

CROSS REFERENCE TO RELATED APPLICATION

The present application claims priority to Korean Patent Application No. 10-2022-0139283, filed on Oct. 26, 2022, the entire contents of which is incorporated herein for all purposes by this reference.

BACKGROUND

1. Field

The present invention relates to a one-touch high-pressure fluid fitting, and more particularly, to a one-touch high-pressure fluid fitting using a spring to maintain an internal airtightness of a fitting body and allow a detachable structure between the fitting body and the fitting cap to be smoothly implemented.

2. Description of Related Art

In general, an insertion tube using a hydraulic pressure is used to inject a fluid into various equipment. For example, an insertion tube connector is provided for maintaining a relatively high fluid pressure. The insertion tube is connected to various equipment through the connector, so that a fluid such as air, water, and oil may be prevented from being leaked and the hydraulic pressure of the fluid may be maintained at a high pressure.

In the related art, the insertion tube is inserted directly into the fitting body in order to couple the insertion tube, in which a user inserts the insertion tube into the fitting by applying a predetermined force, and fastens the insertion tube with the fitting body by using a tightening tool or the like, which may cause inconvenience.

In order to solve the above inconvenient problem, a one-touch fitting has been developed. In general, a high-pressure type fluid quick fitting has a plurality of cut pieces cut at a lower portion of a fitting cap coupled to one end of a fitting body, and each cut piece has an elastic restoring force so as to open outward. In addition, the cut piece is formed with a protrusion toward a center so as to hold an inserted insertion tube.

In addition, in order to remove the insertion tube, an external force may be applied to the fitting cap so that the cut pieces of the fitting cap are opened outward, so as to release the binding between the protrusion and the insertion tube, and remove the insertion tube from the fitting body.

However, according to the conventional one-touch fitting, it is difficult to maintain an airtightness in the fitting body. When removing the insertion tube, the fitting cap may get caught in the fitting body or the insertion tube may fail to be smoothly removed from the fitting cap, depending on the user's external force applied to the fitting cap.

(Patent Document 1) Korean Unexamined Patent Publication No. 10-2021-0069239 (Published on Jun. 11, 2021), titled by "HYDRAULIC TUBE CONNECTOR WITH TAPERED SEALING SURFACE"

SUMMARY

In order to solve the above problem, the present invention provides a one-touch high-pressure fluid fitting using a spring, in which the spring is used to press a sealing ring and simultaneously elastically support an inward inclined surface of a fitting cap, and the fitting cap is expanded upon unfastening to maintain an internal airtightness of a fitting body and allow a detachable structure between the fitting body and the fitting cap to be smoothly implemented.

In order to achieve the above-mentioned object, the present invention provides a one-touch high-pressure fluid fitting using a spring, which includes: a fitting body formed with an inlet and an insertion hole and having a hollow portion; a fitting cap coupled to the fitting body and including a cut piece having one end formed with an inward inclined surface; a support member positioned in the hollow portion to support the inward inclined surface of the fitting cap; and an insertion tube fastened to or unfastened from the hollow portion of the fitting body.

In addition, the supporting member may include a sealing ring mounted on the hollow portion of the fitting body, a flat ring coming into contact with the sealing ring, and a spring coming into contact with the sealing ring to elastically support the inward inclined surface.

In addition, the cut piece of the fitting cap 200 may be formed with a locking protrusion part adjacent to the inward inclined surface, and the insertion tube may be formed therein with a locking groove, so that the locking protrusion and the locking groove are fastened or unfastened with each other.

In addition, a check valve may be formed in the hollow portion of the fitting body.

In addition, the fitting cap may be formed therein with a pressing part, and the inward inclined surface of the cut part may be slid and bent outward on the spring when the pressing part is pressed, so that the insertion tube is in a detachable state.

In order to solve the above problem, according to the one-touch high-pressure fluid fitting using a spring of the present invention, the spring is used to press a sealing ring and simultaneously elastically support an inward inclined surface of a fitting cap, and the fitting cap is expanded upon unfastening, so that an internal airtightness of a fitting body can be maintained and a detachable structure between the fitting body and the fitting cap can be smoothly implemented.

DETAILED DESCRIPTION

Hereinafter, the detailed descriptions of the present invention are embodiments for carrying out the present invention, and the corresponding embodiment refers to the accompanying drawings as an example. The embodiments will be described in detail to enable those skilled in the art to carry out the present invention. It is apparent to be understood that the various embodiments of the present invention may be different from each other but do not need to be mutually exclusive. For example, the particular shape, structure, and feature described herein may be embodied in other embodiments without departing from the idea and scope of the present invention in connection with the embodiment. In addition, it will be understood that the location or arrangement of an individual element within each disclosed embodiment may be modified without departing from the idea and scope of the present invention.

Accordingly, the following detailed description does not disclose a limited meaning, and the scope of the invention is limited only by the appended claims, along with the full scope of equivalents to which the claims are entitled, if properly explained. Similar reference numerals in the drawings refer to the same or similar function throughout several aspects.

General term which is widely used recently has been selected in the present invention in consideration of the function according to the present invention as possible, however, the term may vary depending on the intention of those skilled in the art, judicial cases, the advent of new technology, or the like. In addition, in certain cases, the term may be arbitrarily selected by the applicant, and in this case, the meaning thereof will be described in detail in the relevant description of the invention. Therefore, the term used in the present invention will be defined based on the meaning of the term and contents throughout the present invention, not simply on the name of the term.

When one part "includes" one element in the present invention, the above expression does not exclude other elements, but may further include the other elements, unless particularly stated otherwise.

Hereinafter, a one-touch high-pressure fluid fitting using a spring according to the present invention will be described in detail with reference to the accompanying drawings.

Figure 1:
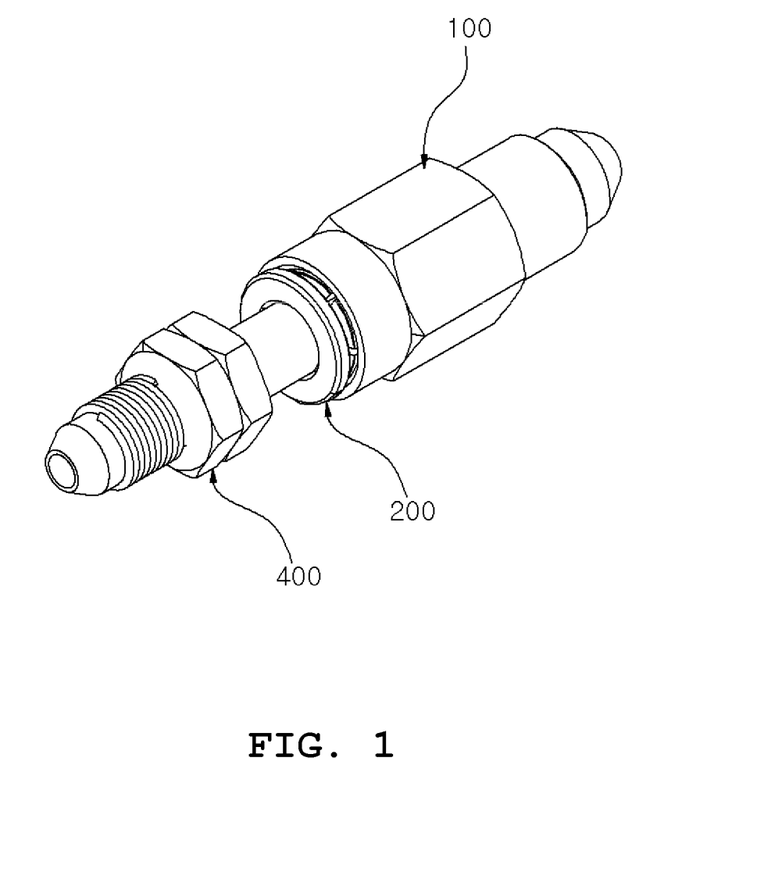
FIG. 1 is a perspective view showing the one-touch high-pressure fluid fitting using a spring according to the embodiments of the present invention.
Figure 2:
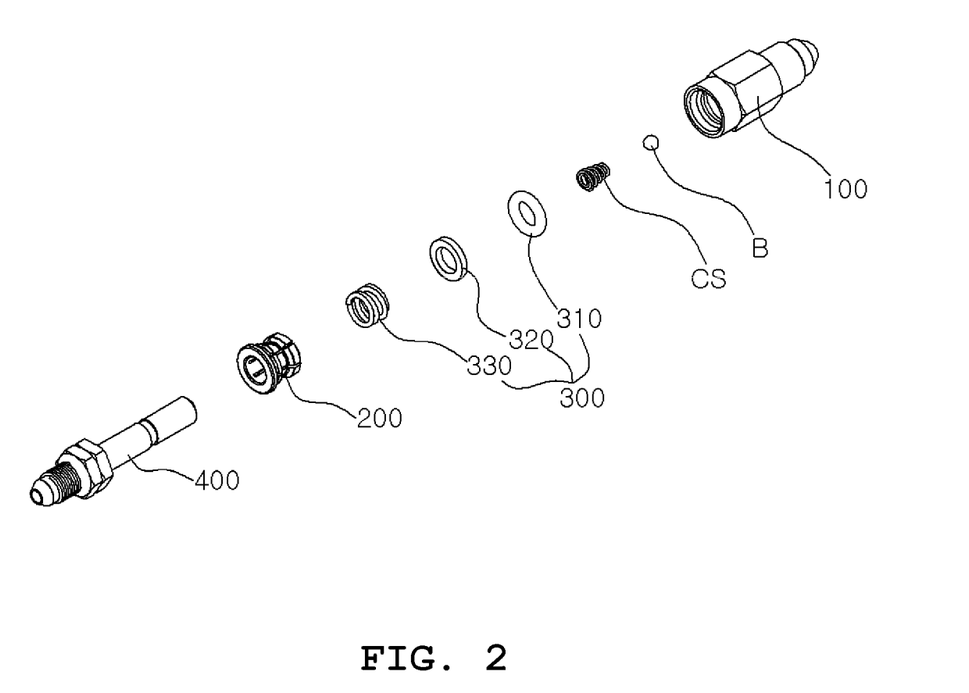
FIG. 2 is an exploded perspective view showing the one-touch high-pressure fluid fitting using a spring according to the embodiments of the present invention.
Figure 3:
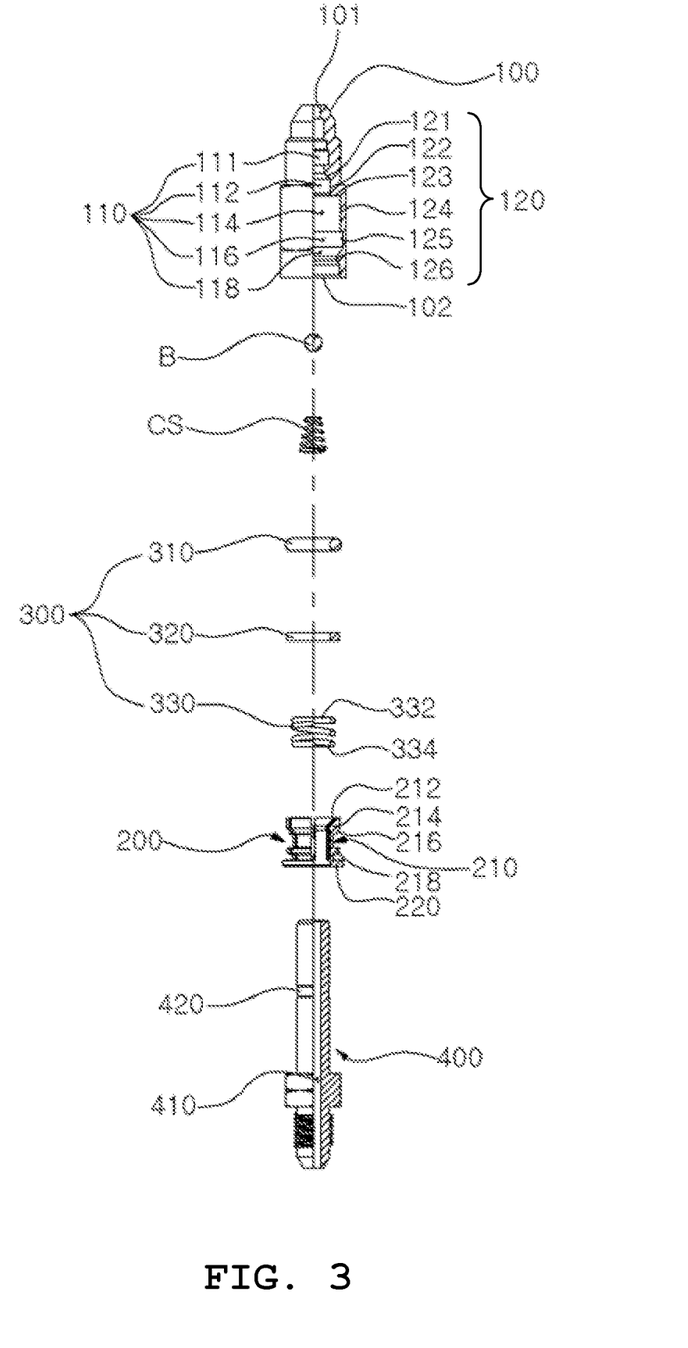
FIG. 3 is an exploded sectional view showing the one-touch high-pressure fluid fitting using a spring according to the embodiments of the present invention.

FIG. 1 is a perspective view showing the one-touch high-pressure fluid fitting using a spring according to the embodiments of the present invention. FIG. 2 is an exploded perspective view showing the one-touch high-pressure fluid fitting using a spring according to the embodiments of the present invention. FIG. 3 is an exploded sectional view showing a state in which one side of the one-touch high-pressure fluid fitting using a spring is cut according to the embodiments of the present invention.

As shown in FIGS. 1 to 3, the one-touch high-pressure fluid fitting using a spring according to the present invention includes: a fitting body 100 formed with an inlet 101 and an insertion hole 102 and having a hollow portion 110; a fitting cap 200 coupled to the fitting body 100, and including a cut piece 210 having one end formed with an inward inclined surface 212; a support member 300 positioned in the hollow portion 110 to support the inward inclined surface 212 of the fitting cap 200; and an insertion tube 400 fastened to or unfastened from the hollow portion 110 of the fitting body 100.

The fitting body 100 is configured such that the insertion tube 400 connected to a fluid tube is inserted and fastened thereto, and configured to serve as a flow pathway for allowing a fluid to be introduced and moved.

The fitting body 100 is formed with an inlet 101 and an insertion hole 102 and has a hollow portion 110.

In the fitting body 100, the fluid is introduced into the inlet 101 and discharged through the insertion hole 102.

For example, the fitting body 100 may be mounted on a container for storing the fluid. The fitting body 100 may be preferably configured such that the inlet 101 is coupled to the container for storage, and the insertion hole 102 faces the opposite side of the container. Alternatively, the fitting body 100 may be mounted on an injection hose. The fitting body 100 may be preferably configured such that the inlet 101 is coupled to the injection hose and the insertion hole 102 faces to the opposite side of the injection hose of the container. The present invention is not limited thereto, and the coupling in the opposite direction may also be applicable.

A hollow portion 110 is formed between the inlet 101 and the insertion hole 102 of the fitting body 100. The hollow portion 110 is closed by a side surface of the fitting body 100, and communicates with the outside through the inlet 101 and the insertion hole 102.

The hollow portion 110 may include a check valve seating hollow part 111, an insertion tube seating hollow part 112, a support member seating hollow part 114, a cut piece expansion hollow part 116, and an inclined hollow part 118, along a longitudinal direction from the inlet 101 to the insertion hole 102. The check valve seating hollow part 111, the insertion tube seating hollow part 112, the support member seating hollow part 114, the cut piece expansion hollow part 116, and the inclined hollow part 118 of the hollow portion 110 entirely communicate with each other. Each components of the hollow portion 110 may preferably have a circular shape when viewed from the inlet 101 or the insertion hole 102.

In addition, the fitting body 100 has an inner wall 120, and the inner wall 120 may include an insertion tube seating inclined wall 121, an insertion tube seating side wall 122, a support member fixing surface 123, a support member seating side wall 124, an incision piece extended side wall 125, and a double inclined protrusion wall 126, along the longitudinal direction from the inlet 101 to the insertion hole 102.

The check valve seating hollow part 111 is a space communicating with the inlet 101 and seated therein with a check valve. The check valve seating hollow part 111 may be preferably formed in a position relatively close to the inlet 101 compared to the insertion tube seating inclined wall 121 and the insertion tube seating side wall 122.

The check valve may be formed in the check valve seating hollow part 111 of the fitting body 100. The check valve may be applied to various implementations such as a ball valve or a disc valve. In the case of ball valve, the check valve may be composed of a check spring CS and a ball B. The check valve may be preferably formed in the check valve seating hollow part 111. The check valve may be applicable for both directions from the inlet 101 to the insertion hole 102, or from the insertion hole 102 to the inlet 101 so as to prevent the fluid from flowing in the opposite direction.

When the insertion tube 400 is inserted to or removed from the fitting body 100, the check valve prevents the fluid from flowing out through the hollow portion 110 of the fitting body 100. In addition, when the insertion tube 400 is inserted to or removed from the fitting body 100, the check valve also serves to prevent a phenomenon in which the insertion tube 400 is not easily inserted or removed due to a residual pressure inside the fitting body 100.

The check valve is not necessarily required, and may or may not be included according to the selection by those skilled in the art.

The insertion tube seating hollow part 112 is a space communicating with the check valve seating hollow part 111 to allow an end of the insertion tube 400 to be seated in the fitting body 100. The insertion tube seating hollow part 112 may be formed by the insertion tube seating inclined wall 121 and the insertion tube seating side wall 122. It may be appropriate that the end of the insertion tube 400 comes into close contact with the insertion tube seating hollow part 112 without a gap. To this end, it may be preferable that the insertion tube seating inclined wall 121 and the insertion tube seating side wall 122 have shapes corresponding to the end of the insertion tube 400. More specifically, it may be appropriate that the insertion tube seating inclined wall 121 is inclined at a predetermined angle with respect to the longitudinal direction from the inlet 101 to the insertion hole 102, and the insertion tube seating side wall 122 is parallel to the longitudinal direction from the inlet 101 to the insertion hole 102. The insertion tube seating hollow part 112 may preferably have a diameter corresponding to an outer diameter of the insertion tube 400.

The support member seating hollow part 114 is a space communicating with the insertion tube seating hollow part 112 and seated therein with the support member 300. The support member seating hollow part 114 may be formed by the support member fixing surface 123 and the support member seating side wall 124. The support member seating hollow part 114 may accommodate a portion of the insertion tube 400, and the support member 300 may be seated on the outside of the insertion tube 400. In order to accommodate the insertion tube 400 and the support member 300, the support member seating hollow part 114 may preferably have a diameter relatively larger than the insertion tube seating hollow part 112. To this end, the support member fixing surface 123 is formed perpendicular to the insertion tube seating side wall 122, and the support member seating side wall 124 is formed parallel to the insertion tube seating side wall 122. More specifically, it may be appropriate that the support member fixing surface 123 is perpendicular to the longitudinal direction from the inlet 101 to the insertion hole 102, and the support member seating side wall 124 is parallel to the longitudinal direction from the inlet 101 to the insertion hole 102.

The cut piece expansion hollow part 116 is a space expanded to allow the cut piece 210 of the fitting cap 200 to spread outward. It may be appropriate that the cut piece expansion hollow part 116 has a diameter relatively larger than the support member seating hollow part 114 in order to provide a space for the cut piece 210 to open outward. In addition, the support member seating hollow part 114 may be defined by the insertion tube expansion side wall 125. The insertion tube extension side wall 125 is formed parallel to the insertion tube seating side wall 122 and the support member seating side wall 124. More specifically, it may be appropriate that the insertion tube expansion side wall 125 is parallel to the longitudinal direction from the inlet 101 to the insertion hole 102.

The double inclined hollow part 118 is a space defined by the double inclined protrusion wall 126 to accommodate the cut piece 210 of the fitting cap 200. The double inclined protrusion wall 126 is a side wall protruding toward the inside of the fitting body 100 to guide the cut piece 210 of the fitting cap 200 or prevent the fitting cap 200 from being excessively inserted. The double inclined protrusion wall 126 may be formed on both sides thereof with inclined surfaces along the longitudinal direction from the inlet 101 to the insertion hole 102. In addition, a predetermined section of a protruding end of the double inclined protrusion wall 126 may be parallel to the insertion tube seating side wall 122, the support member seating side wall 124 and the insertion tube extension side wall 125.

The fitting cap 200 is coupled to the fitting body 100, and includes a cut piece 210 having one end formed with an inward inclined surface 212.

The fitting cap 200 may be formed in a tubular shape, and may be preferably formed of a metal material. The fitting cap 200 is formed with a cut piece 210 and a pressing part 220.

The fitting cap 200 may be formed with a plurality of cut parts, and a plurality of cut pieces 210 are formed by the cut parts. The cut pieces 210 are arranged in a tubular shape, and accordingly, the fitting cap 200 also has a tubular shape as a whole. The cut pieces 210 may be preferably formed of a material having an elastic restoring force so as to be opened outward and returned to the original state. It may be preferable that the tubular portion formed by gathering the cut parts 210 in the fitting cap 200 has a predetermined diameter so as to be inserted into the fitting body 100. More specifically, an outer diameter of the tubular portion formed by gathering the cut parts 210 in the fitting cap 200 may correspond to a diameter of the insertion hole 102.

The cut pieces 210 extend toward the opposite side from the pressing part 220, and accordingly, the portion positioned most opposite to the pressing part 220 may be referred to as an end of the cut piece 210.

An inward inclined surface 212 may be formed at the end of the cut piece 210. The inward inclined surface 212 is formed at the end of the cut piece 210 and formed toward a center of the fitting cap 200. The inward inclined surface 212 may be configured to come into contact with the support member 300, and enable the cut piece 210 to open outward while sliding on the support member 300.

A locking protrusion part 214 may be formed adjacent to the inward inclined surface 212. The locking protrusion part 214 is formed to protrude more inward than the inward inclined surface 212, and serves to fasten or unfasten the insertion tube 400 according to the opening of the cut piece 210.

An outward inclined surface 216 may be formed on a side opposite to the inward inclined surface 212, that is, on an outer side of the fitting cap 200. When the fitting cap 200 is fastened to the fitting body 100, the outward inclined surface 216 may come into contact with the double inclined protrusion wall 126 of the fitting body 100. When the cut part 210 having opened outward is momentarily retracted and returned to the original state, the outward inclined surface 216 is configured to prevent the fitting cap 200 from being separated from the fitting body 100.

In addition, a cut piece protrusion part 218 protruding outward may be formed in a predetermined area of the cut piece 210 from the outward inclined surface 216 to the pressing part 220. The cut piece protrusion part 218 serves to prevent the fitting cap 200 from shaking in a lateral direction in the hollow portion 110 of the fitting body 100. Accordingly, it may be appropriate that the cut piece protrusion part 218 has a diameter corresponding to an inner diameter of the insertion hole 102 of the fitting body 100.

The pressing part 220 is formed on the opposite side of the fitting cap 200 formed with the cut piece 210. The pressing part 220 is configured to be used when the insertion tube 400 is moved from the fitting body 100, so that the user presses the pressing part 220 to open the cut part 210 outward, thereby allowing the insertion tube 400 to be separated from the fitting body 100. The pressing part 220 may preferably have a diameter relatively larger than the insertion hole 102 of the fitting body 100 and the area formed with the cut part 210. Due to the pressing of the pressing part 220, the inward inclined surface 212 of the cut part 210 is slid and bent outward on the spring 330, so that the insertion tube 400 may be in a detachable state.

The support member 300 is positioned in the hollow portion 110, and supports the fitting cap 200 while coming into contact with the inward inclined surface 212 of the fitting cap 200.

The support member 300 may include a sealing ring 310 mounted on the hollow portion of the fitting body 100, a flat ring 320 coming into contact with the sealing ring 310, and a spring 330 coming into contact with the sealing ring 320 to elastically support the inward inclined surface 212.

The sealing ring 310 is configured to maintain an airtightness between the fitting body 100 and the insertion tube 400. The sealing ring 310 may be preferably formed in a ring shape, and formed of a soft material. The sealing ring 310 is seated in the fitting body 100 to come into close contact with the support member fixing surface 123 and the support member seating side wall 124. It may be preferable that an inner diameter of the sealing ring 310 corresponds to the outer diameter of the insertion tube 400, and an outer diameter of the sealing ring 310 corresponds to a diameter of the support member seating hollow part 114 formed by the support member seating side wall 124. The sealing ring 310 may preferably have a section with a circular shape.

It is preferable that the flat ring 320 is formed adjacent to the sealing ring 310, formed in a ring shape, and formed of a relatively hard material compared to the sealing ring 310. The flat ring 320 has one surface coming into contact with the sealing ring 310 and a surface opposite to the one surface, which are flat. More specifically, the flat ring 320 may preferably have a rectangular parallelepiped section. The flat ring 320 is positioned between the spring 330 and the sealing ring 310, and allows the spring 330 to indirectly press the sealing ring 310 through the flat ring 320 without directly pressing the sealing ring 310, so that the elastic support force is uniformly transferred from the spring 330 to the sealing ring 310. In addition, the flat ring 320 supports the spring 330 in a flat state, thereby serving to allow the spring 330 to maintain an equilibrium state and prevent the spring 330 from deviating from a designated position and causing a minor breakdown.

The spring 330 elastically supports the inward inclined surface 212 with respect to the sealing ring 310 while coming into contact with the flat ring 320 and pressing the sealing ring 310. The spring 330 may be, preferably, formed of a material having an elastic force and a restoring force, and most preferably, formed of a metal material. The spring 330 may be a coil spring and have both ends with flat surfaces, so that the elastic force and the restoring force are implemented through a metal coil wound spirally therebetween.

Accordingly, the spring 330 may be formed with a first flat part 332 and a second flat part 334 at both ends thereof in the longitudinal direction. The first flat part 332 comes into contact with the flat ring 320, and the second flat portion 334 comes into contact with the inward inclined surface 212 formed on the cut piece 210 of the fitting cap 200. Accordingly, the spring 330 may press the flat ring 320 through the first flat part 332, and transfer the elastic force to the inward inclined surface 212 formed on the cut piece 210 of the fitting cap 200 through the second flat part 334. The spring 330 may serve to allow the flat ring 320 and the sealing ring 310 to maintain fixed positions. In addition, the spring 330 may act such that the cut piece 210 of the fitting cap 200 opens outward. In addition, the spring 330 allows the fitting cap 200 to be elastically supported without being inserted at a predetermined depth or more. In order to perform the above roles, the spring 330 may preferably have a sufficient elastic force at a predetermined strength or more.

It may be preferable that the spring 330 is inserted into the hollow portion 110 inside the fitting body 100 along the longitudinal direction from the insertion hole 102 toward the inlet 101. More specifically, it may be appropriate that the spring 330 is inserted into the hollow portion 110 inside the fitting body 100, such that the first flat part 332 faces the support member fixing surface 123 or the inlet 101 and the second flat part 334 faces the fitting cap 200 or the insertion hole 102.

The insertion tube 400 is fastened to or unfastened from the hollow portion 110 of the fitting body 100.

The insertion tube 400 is formed therein with an insertion tube flow path 410, and the insertion tube flow path 410 is formed through the insertion tube 400 along the longitudinal direction thereof.

An end of the insertion tube 400 is formed in a shape corresponding to come into close contact with the insertion tube seating hollow part 112. Accordingly, the end of the insertion tube 400 may have an inclined surface at an angle corresponding to the insertion tube seating inclined wall 121.

In addition, a locking groove 420 is formed in a predetermined section of an outer circumference of the insertion tube 400. The locking groove 420 is configured to be caught by the locking protrusion part 214 of the fitting cap 200 to prevent the insertion tube 400 from being arbitrarily removed from the fitting body 100.

In other words, the cut piece 210 of the fitting cap 200 is formed with the locking protrusion part 214 inwardly adjacent to the inward inclined surface 212, and the locking groove 420 is formed on the outer circumference of the insertion tube 400, so that the locking protrusion part 214 and the locking groove 420 may be mutually fastened or unfastened.

Hereinafter, the process of fastening the insertion tube of the one-touch high-pressure fluid fitting using a spring according to the present invention will be described in detail with reference to the accompanying drawings.

Figure 4:
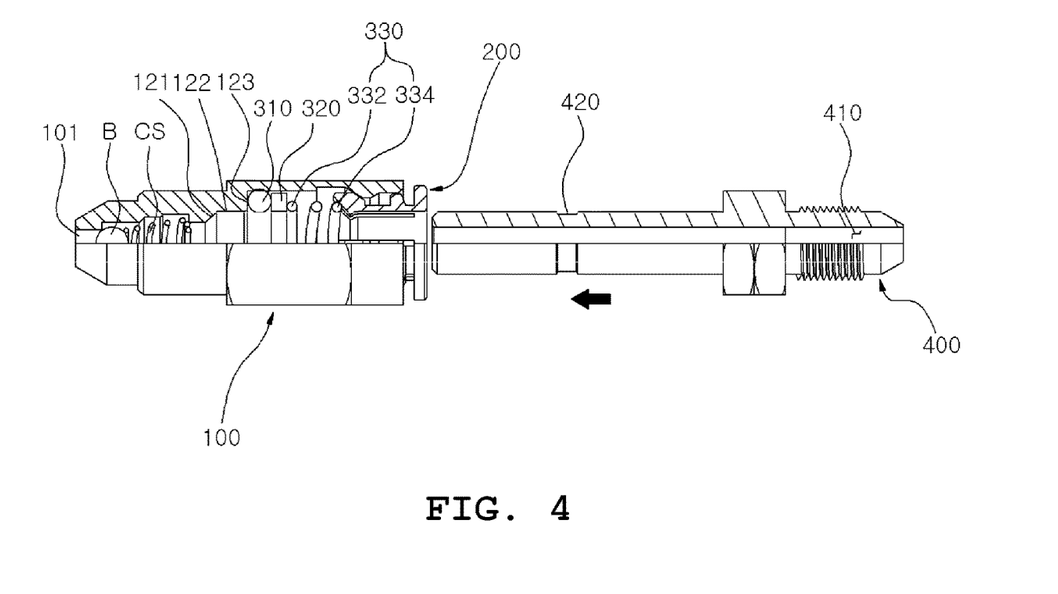
FIG. 4 is a sectional view showing a state before the insertion tube is inserted into the fitting body in the one-touch high-pressure fluid fitting using a spring according to the embodiments of the present invention.
Figure 5:
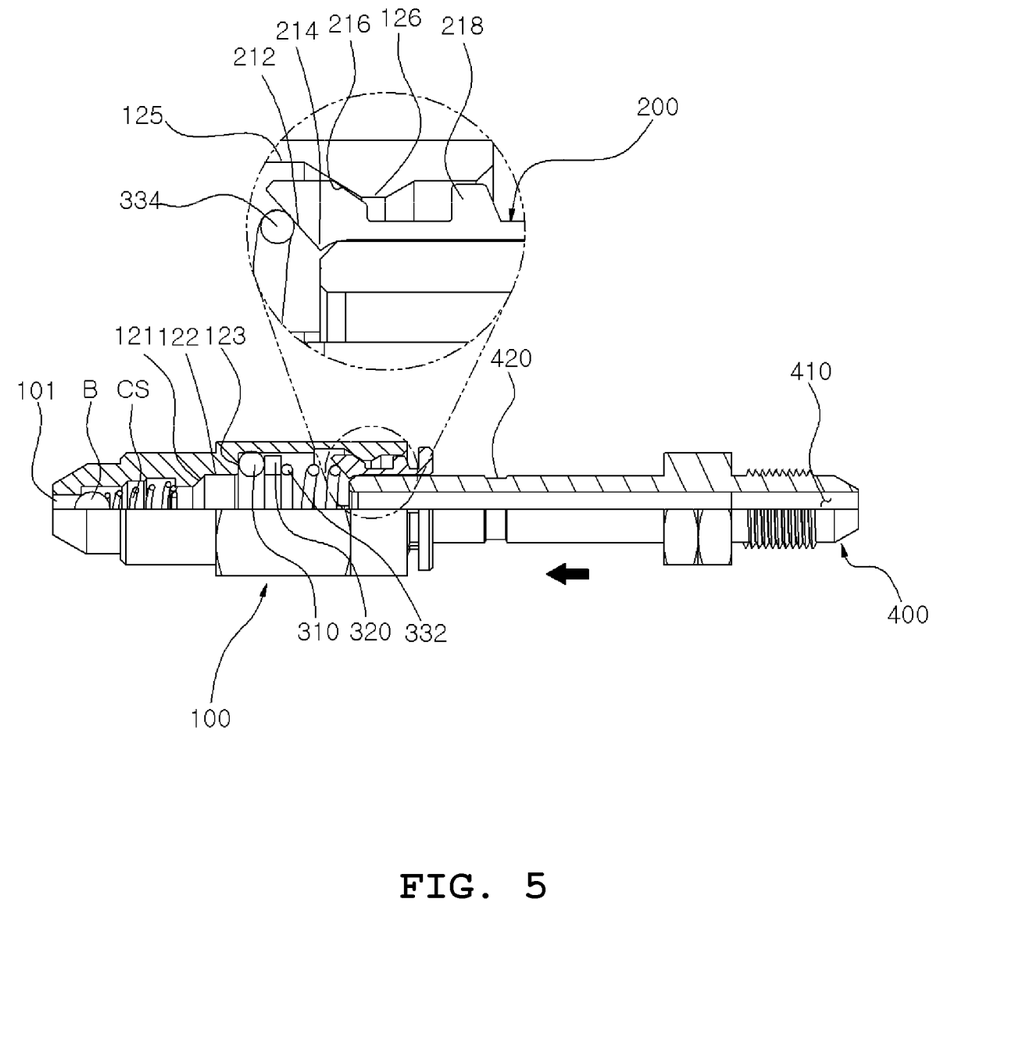
FIG. 5 is a sectional view showing a state before an end of the insertion tube is caught on a locking protrusion in the one-touch high-pressure fluid fitting using a spring according to the embodiments of the present invention.
Figure 6:
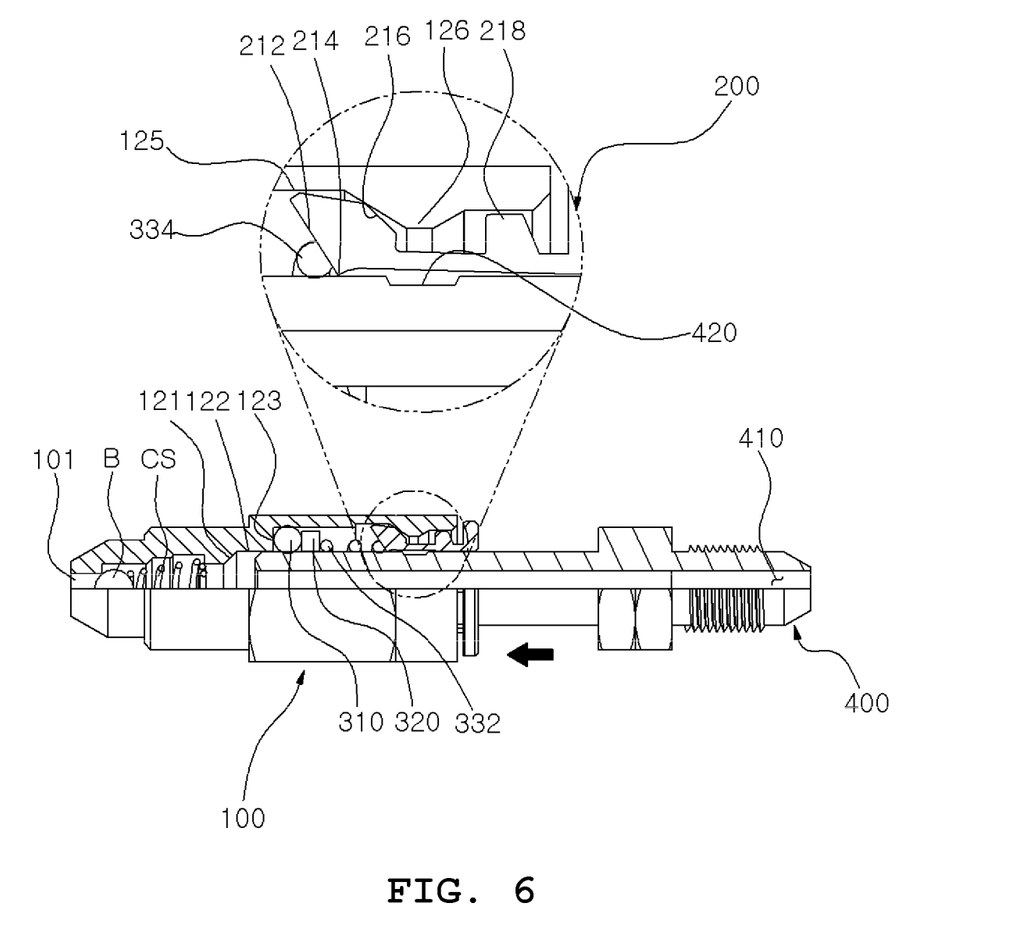
FIG. 6 is a sectional view showing a state before a locking groove is caught on the locking protrusion in the one-touch high-pressure fluid fitting using a spring according to the embodiments of the present invention.
Figure 7:
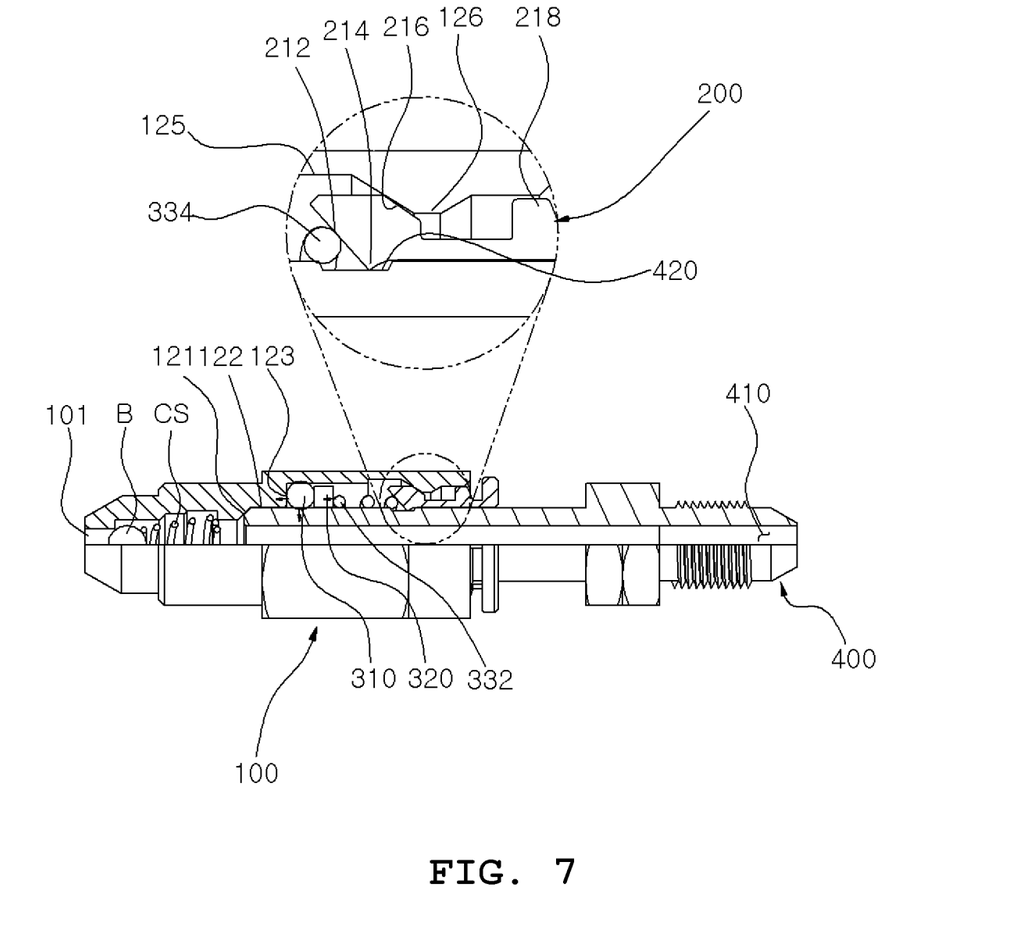
FIG. 7 is a sectional view showing a state in which the insertion tube is fastened to the fitting body in the one-touch high-pressure fluid fitting using a spring according to the embodiments of the present invention.

FIG. 4 is a sectional view showing a state before the insertion tube is inserted into the fitting body in the one-touch high-pressure fluid fitting using a spring according to the embodiments of the present invention. FIG. 5 is a sectional view showing a state before an end of the insertion tube is caught on a locking protrusion in the one-touch high-pressure fluid fitting using a spring according to the embodiments of the present invention. FIG. 6 is a sectional view showing a state before a locking groove is caught on the locking protrusion in the one-touch high-pressure fluid fitting using a spring according to the embodiments of the present invention. FIG. 7 is a sectional view showing a state in which the insertion tube is fastened to the fitting body in the one-touch high-pressure fluid fitting using a spring according to the embodiments of the present invention.

First, as shown in FIGS. 4 to 5, the one-touch high-pressure fluid fitting using a spring according to the embodiments of the present invention is provided after the fitting body 100, the fitting cap 200, and the support member 300 are combined with each other, and the check valve including the check spring CS and the ball B is formed in the fitting body 100.

The sealing ring 310, the flat ring 320 and the spring 330 are sequentially seated on the support member fixing surface 123 of the fitting body 100, and the fitting cap 200 is inserted into the fitting body 100 to come into contact with the spring 330.

The first flat part 332 of the spring 330 comes into contact with the flat ring 320, and the second flat part 334 elastically supports the inward inclined surface 212 formed on the cut piece 210 of the fitting cap 200.

The fitting cap 200 is elastically supported by the spring 330, so that the outward inclined surface 216 formed on the cut piece 210 is positioned in contact with one inclined surface of the double inclined protrusion wall 126.

In the above state, as shown in FIG. 5, the insertion tube 400 is inserted into the fitting body 100 after passing through the fitting cap 200.

When the user inserts the insertion tube 400 to a predetermined depth, the end of the insertion tube 400 comes into contact with the locking protrusion part 214 of the fitting cap 200.

When the user further presses the insertion tube 400, the end of the insertion tube 400 drags the locking protrusion part 214 of the fitting cap 200 inward, so that the fitting cap 200 is inserted into the fitting body 100 at a predetermined depth. Thereafter, a force is exerted such that the inclined end of the insertion tube 400 pushes the locking protrusion part 214 of the fitting cap 200 outward, so that the cut piece 210 of the fitting cap 200 opens outward. The spring 330 is compressed by the pressing force of the insertion tube 400, and restored while pushing the inward inclined surface in an opposite direction at a moment when the cut part 210 opens.

Thereafter, as shown in FIG. 6, the insertion tube 400 is continuously inserted into the fitting body 100 by the user's external force.

In addition, while the insertion tube 400 is inserted into the fitting body 100, the fitting cap 200 may also be drawn into the fitting body 100 at a predetermined depth due to a frictional force between the locking protrusion part 214 and the outer circumference of the insertion tube 400.

In addition, the fitting cap 200 may be differently drawn into the fitting body 100 by the frictional force with the outer circumference of the insertion tube 400 according to the difference between the external force applied by the user and the used elastic support force of the spring 330. However, since the cut piece protrusion part 218 is caught on the double inclined protrusion wall 126, or the pressing part 220 is caught on the fitting body 100, the fitting cap 200 is prevented from being completely inserted into the fitting body 100.

In addition, since the spring 330 having a strong elastic support force is used in actual implementation, the state of the outward inclined surface 216 coming into contact with the double inclined protrusion wall 126 is maintained until the locking protrusion part 214 of the fitting cap 200 is inserted into the locking groove 420 of the insertion tube 400.

In addition, as shown in FIG. 7, when the locking protrusion part 214 of the fitting cap 200 is inserted into the locking groove 420 of the insertion tube 400, the coupling of the insertion tube 400 to the fitting body 100 is completed.

As shown in FIG. 7, when the locking groove 420 is fastened to the locking protrusion part 214, the insertion tube 400 maintains the fastening state unless a large force is applied.

The second flat part 334 of the spring 330 is fixed in contact with the inward inclined surface 212, and the first flat part 332 applies the elastic support force to the flat ring 320. Accordingly, the flat ring 320 transfers the elastic support force to the sealing ring 310, and the soft sealing ring 310 is pressed to the support member fixing surface 123 and simultaneously expanded to press the side of the insertion tube 400.

According to the above configuration, the sealing ring 310 is compressed and expanded through the elastic support force of the spring 330, so that spaces between the sealing ring 310 and the side of the insertion tube 400 and between the sealing ring 310 and the support member fixing surface 123 may be completely sealed.

In addition, the spring 330 is soft and has a circular section, so as to come into indirect contact through the flat ring 320 having a rectangular section without coming into direct contact with the sealing ring 310 having an uneven contact part, so that minor breakdowns such as defective contact parts and deviations from designated positions may be prevented.

Hereinafter, the process of removing the insertion tube from the fitting body in the one-touch high-pressure fluid fitting using a spring according to the embodiments of the present invention will be described with reference to the accompanying drawings.

Figure 8:
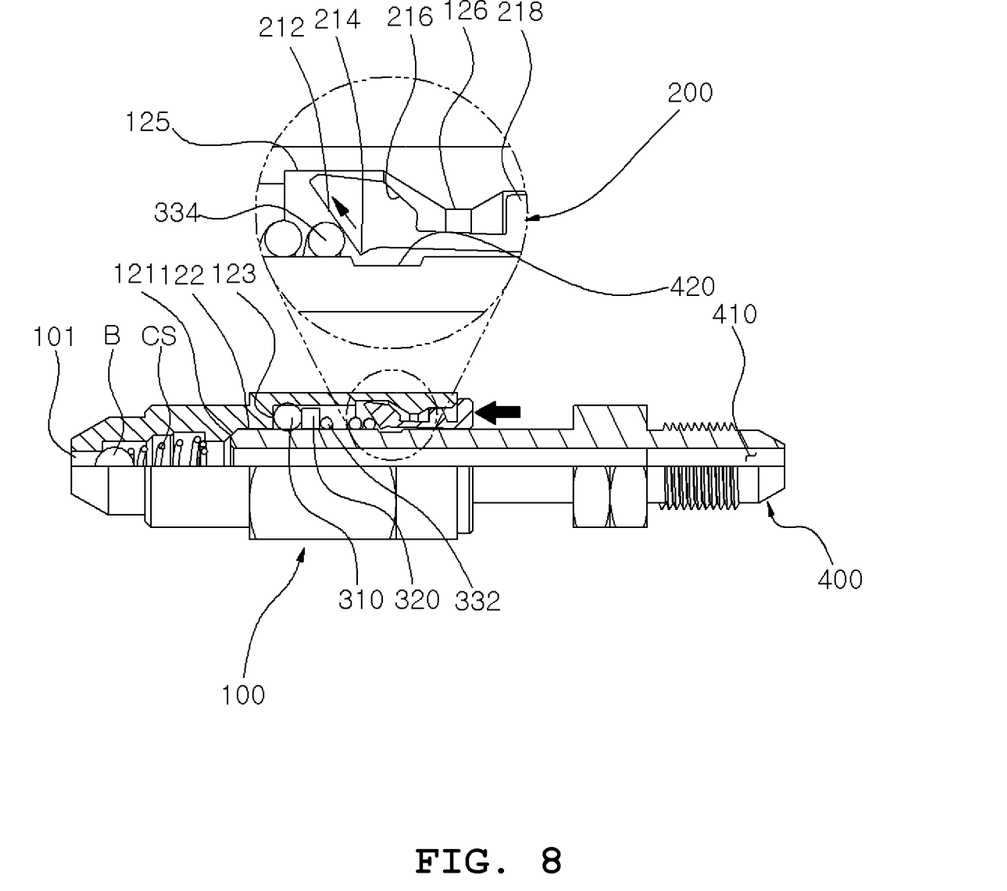
FIG. 8 is a sectional view showing the process of removing the insertion tube from the fitting body in the one-touch high-pressure fluid fitting using a spring according to the embodiments of the present invention.

FIG. 8 is a sectional view showing the process of removing the insertion tube from the fitting body in the one-touch high-pressure fluid fitting using a spring according to the embodiments of the present invention.

First, in order to remove the insertion tube 400 from the fitting cap 200, the user presses the pressing part 220 of the fitting cap 200 toward the inside of the fitting body 100.

Accordingly, the fitting cap 200 is inserted toward the inside of the fitting body 100. when pressed to a predetermined depth or more by the user's press, the spring 330 is compressed, so that the elastic supporting force of the spring 330 becomes relatively large compared to an inward contracting force of the cut piece 210, and accordingly, the cut part 210 begins to open outward while the inward inclined surface 212 slides on the spring 330. At this point, the spring 330 maintains the equilibrium by the flat ring 320.

Accordingly, the locking protrusion part 214 is also separated from the locking groove 420 while opening outward, and the insertion tube 400 is put in a detachable state with respect to the fitting body 100 and the fitting cap 200. The user may pull and separate the insertion tube 400 while continuing to maintain the state of pressing the pressing part 220.

Thus, according to the one-touch high-pressure fluid fitting using a spring of the present invention, the force applied by the user is relatively uniformly transferred to the fitting cap 200 by the spring 330 when the fitting cap 200 is pressed for removing the insertion tube 400, so as to prevent minor malfunctions, for example, the fitting cap 200 is tilted and moved to one side and caught in the fitting body 100.

Further, according to the one-touch high-pressure fluid fitting using a spring of the present invention, since the force applied by the user is relatively uniformly transferred to the fitting cap 200 by the spring 330 when the fitting cap 200 is pressed for removing the insertion tube 400, the fitting cap 200 is inserted in maximally parallel to the inner wall 120 of the fitting body 100, so that the insertion tube 400 may be easily separated.

In addition, according to the one-touch high-pressure fluid fitting using a spring of the present invention, the pressing scheme through the spring 330 is adopted for pressing the fitting cap 200 to remove the insertion tube 400, thereby smoothing the user's press with respect to the pressing part 220, so that feeling in use may be improved.

The present invention has been described with reference to the accompanying drawings. However, the description is merely one example of various embodiments including the idea of the present invention, and the purpose is to enable a person having ordinary skill in the art to carry out the present invention. Therefore, it is clear that the present invention is not limited to the embodiments described above. Accordingly, the protection scope of the present invention will be understood according to the following claims, and all technical ideas within the scope equivalent to the modifications, substitution, replacements and the like within the scope not departing from the idea of the present invention will be included in the right of the present invention. In addition, it is clear that some components of the drawings are provided in an exaggerated or reduced form than in reality for more clearly describing the configuration.

What is claimed is:

1. One-touch high-pressure fluid fitting using a spring, the one-touch high-pressure fluid fitting comprising:
    a fitting body formed with an inlet and an insertion hole and having a hollow portion;
    a fitting cap coupled to the fitting body, and including a cut piece having one end formed with an inward inclined surface;
    a support member positioned in the hollow portion to support the inward inclined surface of the fitting cap; and
    an insertion tube inserted into the hollow portion of the fitting body and fastened to or unfastened from the fitting cap,
    wherein the hollow portion includes a check valve seating hollow part, an insertion tube seating hollow part, a support member seating hollow part, a cut piece expansion hollow part, and an inclined hollow part, along a longitudinal direction from the inlet to the insertion hole,
    wherein the fitting body includes an inner wall, and the inner wall includes an insertion tube seating inclined wall, an insertion tube seating side wall, a support member fixing surface, a support member seating side wall, an insertion tube extension side wall, and a double inclined protrusion wall, along the longitudinal direction from the inlet to the insertion hole,
    wherein inclined surfaces are formed on both sides of the double inclined protrusion wall along the longitudinal direction from the inlet to the insertion hole,
    wherein a predetermined section of a protruding end of the double inclined protrusion wall is parallel to the insertion tube seating side wall, the support member seating side wall and the insertion tube extension side wall,
    wherein the support member includes a sealing ring mounted on the hollow portion of the fitting body, a flat ring coming into contact with the sealing ring, and a spring coming into contact with the flat ring to elastically support the inward inclined surface of the fitting cap,
    wherein the cut piece includes an outward inclined surface which is formed on a side opposite to the inward inclined surface of the fitting cap,
    wherein the spring elastically supports the inward inclined surface of the fitting cap, when the fitting cap is fastened to the fitting body, so that the outward inclined surface formed on the cut piece is positioned in contact with one inclined surface of the double inclined protrusion wall,
    wherein the spring is formed with a first flat part and a second flat part at both ends thereof in the longitudinal direction,
    wherein the first flat part comes into contact with the flat ring, and the second flat part comes into contact with the inward inclined surface formed on the cut piece of the fitting cap,
    wherein the spring presses the flat ring through the first flat part, and transfers an elastic force to the inward inclined surface formed on the cut piece of the fitting cap through the second flat part,
    wherein the cut piece of the fitting cap is formed with a locking protrusion part adjacent to the inward inclined surface, and the insertion tube is formed therein with a locking groove, so that the locking protrusion part and the locking groove are fastened or unfastened with each other,
    wherein when the insertion tube is fastened to the fitting body, the inward inclined surface of the fitting cap is pressed against the second flat part of the spring outwardly in order for the cut piece of the fitting cap to expand outward into the insertion tube extension side wall, until the locking protrusion part of the fitting cap is received in the locking groove of the insertion tube and the second flat part of the spring pushes outward against the inward inclined surface of the fitting cap to make the outward inclined surface of the fitting cap be in contact with and be resisted by the one inclined surface of the double inclined protrusion wall, and
    wherein when the fitting cap is pressed toward the fitting body to unfasten the insertion tube from the fitting body, the inward inclined surface of the fitting cap presses the second flat part of the spring in order for the cut piece of the fitting cap to expand outward, until the locking protrusion part of the fitting cap releases from the locking groove of the insertion tube to facilitate unfastening of the insertion tube out of the fitting body.

2. The one-touch high-pressure fluid fitting of claim 1, wherein the fitting cap is formed therein with a pressing part, and the inward inclined surface of the cut part is slid and opens outward on the spring when the pressing part is pressed, so that the insertion tube is in a detachable state.

* * * * *